Aug. 26, 1958  H. W. STEINMANN  2,849,444
PROCESS FOR THE PREPARATION OF ORGANIC
ACID ESTERS OF CELLULOSE
Filed June 22, 1955
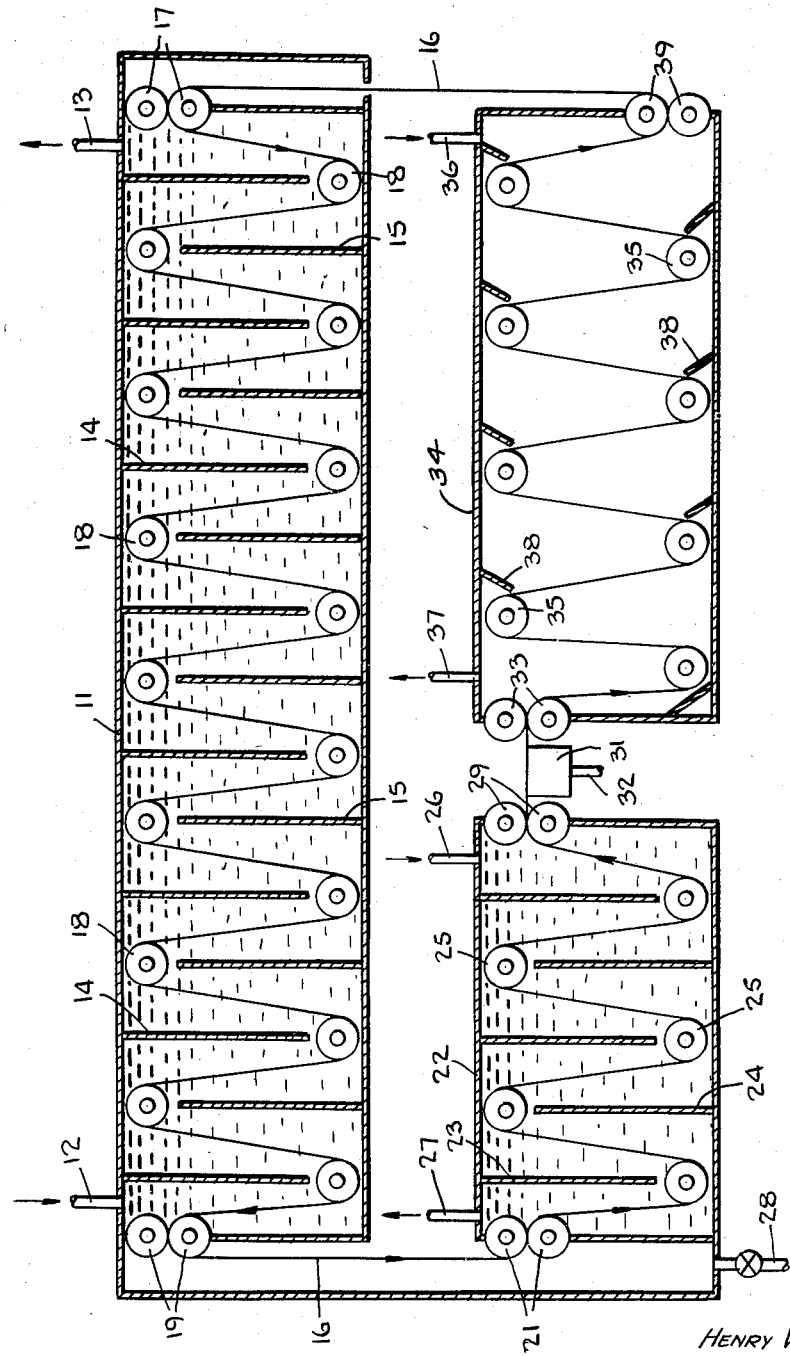
INVENTOR.
HENRY W. STEINMANN
BY
ATTORNEYS United States Patent Office 2,849,444
Patented Aug. 26, 1958

2,849,444

PROCESS FOR THE PREPARATION OF ORGANIC ACID ESTERS OF CELLULOSE

Henry W. Steinmann, Madison, N. J., assignor to Celanese Corporation of America, New York, N. Y., a corporation of Delaware Application June 22, 1955, Serial No. 517,195

13 Claims. (Cl. 260—230)

This invention relates to organic acid esters of cellulose and relates more particularly to an improved process and apparatus for the production of organic acid esters of cellulose by the homogeneous or solution process.

An important object of this invention is to provide an efficient, economical process and apparatus for dewatering solutions of organic acid esters of cellulose in water-immiscible solvents.

Other objects of this invention will be apparent from the following detailed description and claims.

In my copending application, Serial No. 443,957, filed July 16, 1954, there is disclosed a process for the production of organic acid esters of cellulose in which cellulose is esterified with an organic acid anhydride in a water-immiscible solvent for the ester being formed. At the completion of the esterification, there is obtained a homogeneous solution of the ester in the water-immiscible solvent, which solution also contains some organic acid anhydride, organic acid, the esterification catalyst and other impurities. This solution may be treated to ripen or partially hydrolyze the organic acid ester of cellulose, if desired. The esterification solution is then extracted with an aqueous medium under such conditions that two phases are present and no precipitation of the organic acid ester of cellulose from the solution takes place. The extracted solution, while substantially free from impurities, contains a relatively high proportion of water and should have at least a portion of such water removed therefrom before it is employed for the spinning of filaments, the casting of films, or the manufacture of other articles.

According to the present invention, the water is removed from a water-containing solution of an organic acid ester of cellulose in a water-immiscible solvent by contacting the solution with a hydrophilic, polymeric material which is insoluble in said solution and which will pick up the water from the said solution. Thereafter, the polymeric material is separated from the solution. Through the use of this process it is possible to achieve a rapid and efficient dewatering of the solution without the need for heating the same or bringing chemically reactive materials into contact with the same, which latter expedients may change the properties of the solution in an undesirable manner.

Any of a large number of hydrophilic, polymeric materials insoluble in the solution being treated may be employed in carrying out this invention. However, it is desirable to employ a polymeric material which has film-forming or, preferably, filament-forming properties and to use such a material in the form of a film or filaments. When this is done, the handling of the polymeric material is considerably simplified and may be carried out readily in a continuous manner. For example, employing a suitable apparatus, a film or filaments of the polymeric material may be passed through the solution to be dewatered to pick up the water from the solution. Then, the said material may be rinsed with a solvent to remove therefrom any organic acid ester of cellulose solution adhering thereto and finally dried with air or the like to remove therefrom the water it has picked up. Preferably, the same solvent is employed to rinse the polymeric material as is present in the solution being dewatered to permit the dilute solution obtained during rinsing to be combined with the solution being treated. The polymeric material may then be recycled through the apparatus. In this way, a continuous dewatering of a large volume of the solution may be effected with a minimum amount of the polymeric material. Examples of suitable polymeric materials are cellulose, sodium carboxymethyl cellulose, wool, casein and silk, which materials may be in the form of films or filaments. The filaments are preferably employed in the form of a fabric for ease in handling. The amount of polymeric material to be employed will depend on its precise nature, but in general good results are obtained when for each part by weight of water in the solution to be dewatered there are employed between about 2 and 5 parts by weight of polymeric material. The dewatering will normally be complete in between about 5 and 20 minutes, depending, of course, upon the conditions that prevail during the dewatering.

The dewatering of the solution may be carried out at room temperatures, or at reduced or elevated temperatures, as desired. The concentration of the organic acid ester of cellulose in the solution being treated is not critical, which constitutes one of the advantages of this process, and may range from as little as about 2% by weight to as much as about 10% by weight. The amount of water in the organic acid ester of cellulose solution will normally range between about 1 and 3% by weight, but the process of this invention is applicable generally to solutions containing smaller or larger amount of water. The water present in the solution imparts to the said solution a cloudy appearance, probably owing to the formation of an emulsion. However, since no precipitation of the organic acid ester of cellulose takes place, it will be referred to herein as a solution.

Examples of organic acid esters of cellulose solutions which may be treated in accordance with this invention include cellulose acetate, cellulose propionate, cellulose butyrate, cellulose acetate propionate, cellulose acetate butyrate, cellulose benzoate and the like. Water-immiscible solvents in which said esters may be dissolved include, for example, nitromethane, m-cresol, cyclopentanone, pyrrole and furfural. There may also be employed chlorinated hydrocarbons, for example, methylene chloride, trichloroethane, trichloroethanol and chloroform. Instead of employing a single material as the solvent, a mixture of materials such as those specified above may be used. In addition, there may be present a small proportion of an auxiliary solvent such as a lower aliphatic alcohol, for example, methanol, ethanol, a propanol, or a butanol. While this invention has been developed especially for the dewatering of water-containing solutions of organic acid esters of cellulose produced by the process of my copending application referred to above, it is generally suitable for the dewatering of water-containing solutions of organic acid esters of cellulose regardless of their method of production.

The accompanying drawing shows diagrammatically and in cross-section an apparatus suitable for carrying out the process of this invention in a continuous manner.

Referring now to the drawing, the reference numeral 11 designates a tank into one end of which the solution to be dewatered is entered through a conduit 12 and from the other end of which the dewatered solution flows through a conduit 13. Positioned within the tank 11 are a plurality of baffles 14 that project downwardly from the top of said tank and a plurality of baffles 15 that project upwardly from the bottom of said tank. The baffles 14 and 15 together define a tortuous passageway through which the solution being dewatered flows from the feed conduit 12 to the delivery conduit 13.

An endless band 16 of a hydrophilic, polymeric material, which may be in the form of a film or fabric, is entered between a pair of squeeze rolls 17 into that end of the tank from which the dewatered solution flows. The polymeric material 16 is guided by means of a series of rolls 18 through the tortuous passageway defined by the baffles 14 and 15 and moves through the tank 11 in a direction opposite to that in which the solution being dewatered flows, dewatering the said solution during its travel. The band 16 leaves the tank between a pair of squeeze rolls 19.

The band 16 is then entered between a pair of squeeze rolls 21 into a tank 22. Like the tank 11, the tank 22 has a plurality of baffles 23 projecting downwardly from the top thereof and a plurality of baffles 24 projecting upwardly from the bottom thereof. The baffles 23 and 24 together also define a tortuous passageway through which the band is guided by means of rolls 25. In the tank 22, the band 16 is washed free from any adhering organic acid ester of cellulose solution by means of a solvent which enters the said tank through a conduit 26, flows through the tortuous passageway defined by the baffles 23 and 24 in a direction opposite to that in which the band 16 moves, and leaves the tank 22 through a conduit 27. The said solvent which has dissolved therein a small proportion of organic acid ester of cellulose may, if desired, be mixed with the solution to be dewatered whereby the said solution is somewhat diluted. Any organic acid ester of cellulose solution that drops off the band 16 as it moves from the tank 11 to the tank 22 is collected by means of a valved conduit 28 and combined with the solution to be dewatered.

The band 16 leaves the tank 22 between a pair of squeeze rolls 29 and then passes over a suction box 31 to which a vacuum is applied through a conduit 32. This causes a stream of air to flow over the band 16, removing therefrom any solvent which adheres to the surface thereof.

The band 16 next enters between a set of squeeze rolls 33 into a drying chamber 34 through which it is guided in a series of festoons by means of rolls 35. A stream of dry, heated air is entered into said drying chamber through a conduit 36 and passes around the festoons of the band 16, evaporating the solvent and water therefrom and leaves the drying chamber through a conduit 37. A plurality of baffles 38 that extend from the top and bottom of the drying chamber almost into contact with the rolls 35 are provided, one adjacent each of said rolls, to prevent the air from flowing around the rolls 35 without coming into contact with the band 16. After it has been thoroughly dried, the band 16 leaves the chamber 34 between a pair of squeeze rolls 39 and is then recycled through the apparatus. In order to move the band 16 through the apparatus, any or all of the rolls 18, 25 and 35 may be driven in any suitable manner.

The following example is given to illustrate this invention further.

*Example*

To 200 parts by weight of a cloudy methylene chloride solution of cellulose acetate having a cellulose acetate concentration of 6% by weight and containing 2.2% by weight of water, there is added 11.85 parts by weight of a fabric woven from regenerated cellulose filaments produced by the viscose process. After 15 minutes the solution is clear, indicating that the water content thereof has been reduced to less than 0.5% by weight. The fabric is squeezed free of excess solution, rinsed with methylene chloride and dried. The fabric is then employed to dewater an additional 200 parts by weight of the same cellulose acetate solution and again produces a clear solution in 15 minutes.

It is to be understood that the foregoing detailed description is merely given by way of illustration and that many variations may be made therein without departing from the spirit of my invention.

Having described my invention, what I desire to secure by Letters Patent is:

1. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, subjecting the solution to a two-phase extraction with an aqueous medium to remove water-soluble materials therefrom, there being present during the extraction a sufficient proportion of water-immiscible solvent to prevent precipitation of the organic acid ester of cellulose from the solution, removing at least a portion of the water present in the extracted solution by contacting the said solution with a hydrophilic polymeric material that is insoluble in said solution to pick up the water from said solution, and separating the polymeric material from said solution.

2. In a process for dewatering a solution of an organic acid ester of cellulose in a water-immiscible solvent containing water in an amount which renders said solution cloudy, the steps which comprise contacting said solution with a hydrophilic polymeric material that is insoluble in said solution, whereby the concentration of water in said solution is diminished, said polymeric material being employed in an amount sufficient to remove the cloudiness of said solution by picking up the water therefrom, and separating the polymeric material from said solution.

3. The process defined in claim 2, wherein said hydrophilic polymeric material is employed in a dry state ranging in weight from about 2 to 5 times the weight of water in the solution to be dewatered.

4. In a process for dewatering water-containing solutions of an organic acid ester of cellulose in a water-immiscible solvent, the steps which comprise contacting the said solution with a film of a hydrophilic polymeric material that is insoluble in said solution to pick up the water from said solution, whereby the concentration of water in said solution is diminished, and separating the polymeric material from said solution.

5. In a process for dewatering a solution of an organic acid ester of cellulose in a water-immiscible solvent containing water in an amount which renders said solution cloudy, the steps which comprise contacting said solution with filaments of a hydrophilic polymeric material that is insoluble in said solution, whereby the concentration of water in said solution is diminished, said polymeric material being employed in an amount sufficient to remove the cloudiness of said solution by picking up the water from said solution, and separating the polymeric material from said solution.

6. In a process for dewatering a solution of an organic acid ester of cellulose in a water-immiscible solvent containing water in an amount which renders said solution cloudy, the steps which comprise contacting said solution with a fabric containing filaments of a hydrophilic polymeric material that is insoluble in said solution, whereby the concentration of water in said solution is diminished, said polymeric material being employed in an amount sufficient to remove the cloudiness of said solution by picking up the water from said solution, and separating the polymeric material from said solution.

7. In a process for dewatering water-containing solutions of an organic acid ester of cellulose in a water-immiscible solvent, the steps which comprise contacting the said solution with a hydrophilic polymeric material that is insoluble in said solution to pick up the water from said solution, whereby the concentration of water in said solution is diminished, separating the polymeric material from said solution, drying the polymeric material, and contacting the polymeric material with an additional quantity of said solution.

8. In a process for dewatering a solution of an organic acid ester of cellulose in a water-immiscible solvent containing water in an amount which renders said solution cloudy, the steps which comprise contacting said solution with cellulose employed in an amount sufficient to remove the cloudiness of said solution by picking up the water from said solution, whereby the concentration of water in said solution is diminished, and separating the cellulose from said solution.

9. In a process for dewatering a solution of cellulose acetate in a water-immiscible solvent containing water in an amount which renders said solution cloudy, the steps which comprise contacting said solution with a hydrophilic polymeric material that is insoluble in said solution, whereby the concentration of water in said solution is diminished, said polymeric material being employed in an amount sufficient to remove the cloudiness of said solution by picking up the water from said solution, and separating the polymeric material from said solution.

10. In a process for dewatering a solution of cellulose acetate in a water-immiscible solvent containing water in an amount which renders said solution cloudy, the steps which comprise contacting said solution with a fabric containing filaments of a hydrophilic polymeric material employed in an amount sufficient to remove the cloudiness of said solution by picking up the water from said solution, whereby the concentration of water in said solution is diminished, and separating the polymeric material from said solution.

11. In a process for dewatering a solution of cellulose acetate in a water-immiscible solvent containing water in an amount which renders said solution cloudy, the steps which comprise contacting said solution with a fabric containing filaments of cellulose employed in an amount sufficient to remove the cloudiness of said solution by picking up the water from said solution, whereby the concentration of water in said solution is diminished, and separating the polymeric material from said solution.

12. In a process for dewatering a solution of cellulose acetate in methylene chloride containing water in an amount which renders said solution cloudy, the steps which comprise contacting said solution with a hydrophilic polymeric material that is insoluble in said solution, said polymeric material being employed in an amount sufficient to remove the cloudiness of said solution by picking up the water from said solution, whereby the concentration of water in said solution is diminished, and separating the polymeric material from said solution.

13. In a process for dewatering a solution of cellulose acetate in methylene chloride containing water in an amount which renders said solution cloudy, the steps which comprise contacting said solution with a fabric containing filaments of cellulose employed in an amount sufficient to remove the cloudiness of said solution by picking up the water from said solution, whereby the concentration of water in said solution is diminished, and separating the polymeric material from said solution.

References Cited in the file of this patent

UNITED STATES PATENTS

| Number | Name | Date |
|---|---|---|
| 2,126,190 | Hofmann | Aug. 9, 1938 |
| 2,214,943 | Tinsley | Sept. 17, 1940 |
| 2,487,197 | Stott et al. | Nov. 8, 1949 |
| 2,628,883 | Dalton et al. | Feb. 17, 1953 |
| 2,678,132 | Beard | May 11, 1954 |